US012006832B2

(12) United States Patent
Mason et al.

(10) Patent No.: US 12,006,832 B2
(45) Date of Patent: Jun. 11, 2024

(54) SUPPORT PLATE FOR ENGINE CASING FLANGE

(71) Applicant: PRATT & WHITNEY CANADA CORP., Longueuil (CA)

(72) Inventors: Bernadette Mason, Milton (CA); Gennadii Dorozhkin, Mississauga (CA); Jesse Albus, Toronto (CA); Tibor Urac, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 117 days.

(21) Appl. No.: 17/452,927

(22) Filed: Oct. 29, 2021

(65) Prior Publication Data

US 2023/0138438 A1 May 4, 2023

(51) Int. Cl.
*F01D 25/24* (2006.01)

(52) U.S. Cl.
CPC ........ *F01D 25/243* (2013.01); *F05D 2240/91* (2013.01); *F05D 2260/30* (2013.01); *F05D 2260/31* (2013.01)

(58) Field of Classification Search
None
See application file for complete search history.

(56) References Cited

U.S. PATENT DOCUMENTS

| | | | | |
|---|---|---|---|---|
| 6,672,833 | B2 | 1/2004 | MacLean et al. | |
| 8,079,773 | B2 | 12/2011 | Blanton | |
| 10,648,478 | B2 | 5/2020 | Chow et al. | |
| 2007/0086854 | A1 * | 4/2007 | Blanton ................ | B29C 65/562 415/232 |
| 2012/0023968 | A1 | 2/2012 | Shteyman et al. | |
| 2022/0235673 | A1 * | 7/2022 | Farabow, III ........... | F01D 25/30 |

FOREIGN PATENT DOCUMENTS

| | | | |
|---|---|---|---|
| EP | 2543828 | A2 | 1/2013 |
| EP | 3156590 | A1 | 4/2017 |
| EP | 3170994 | A1 | 5/2017 |
| WO | 20140164189 | A1 | 10/2014 |
| WO | 20210021287 | | 2/2021 |

OTHER PUBLICATIONS

European Search Report issued in counterpart application 22204819.1 dated Mar. 13, 2023.

* cited by examiner

*Primary Examiner* — Gerald L Sung
*Assistant Examiner* — Alyson Joan Harrington
(74) *Attorney, Agent, or Firm* — NORTON ROSE FULBRIGHT CANADA LLP

(57) ABSTRACT

A support plate for an engine casing includes an anti-rotation rib abutting an outer flange wall of the casing and a misalignment tab extending radially outwardly from the anti-rotation rib. The support plate has a support plate hole configured to be aligned with one flange hole of a flange of the casing.

19 Claims, 5 Drawing Sheets

SUPPORT PLATE FOR ENGINE CASING FLANGE

TECHNICAL FIELD

The application relates generally to gas turbine engines and, more particularly, to casings for gas turbine engines.

BACKGROUND

One casing in a gas turbine engine may be connected to another casing of the gas turbine engine at a joint composed of mating flanges from each casing. The casings are secured to one another by bolting their flanges together. The casings experience loads during operation of the gas turbine engine. These loads may stress the bolts and/or the mating flanges, which may cause deformation of the flanges.

SUMMARY

There is disclosed an engine casing, comprising: an annular casing wall defining a center axis, and a flange extending from the annular casing wall radially outwardly to an outer flange wall, the flange having a plurality of flange holes radially inward of the outer flange wall; a support plate against the flange, the support plate having an anti-rotation rib abutting the outer flange wall and a misalignment tab extending radially outwardly from the anti-rotation rib, the support plate having a support plate hole aligned with one flange hole of the plurality of flange holes; and a fastener extending through the support plate hole and through the one flange hole.

There is disclosed a support plate for an engine casing, the support plate comprising: a body having a first side and a second side opposite the first side, the body extending between an outer end and an inner end and defining a center axis; a support plate hole extending through the body between the first and second sides and about the center axis; an anti-rotation rib on one or both of the first and second sides and disposed radially outwardly of the support plate hole; and a misalignment tab extending radially outwardly from the anti-rotation rib at the outer end.

There is disclosed a casing assembly of an engine, the casing assembly comprising: a first casing having a first flange with first flange holes; a second casing having a second flange against the first flange, the second flange having second flange holes, at least one second flange hole of the second flange holes aligned with at least one first flange hole of the first flange holes; a support plate against one of the first flange and the second flange, the support plate having an anti-rotation rib abutting the one of the first flange and the second flange and a misalignment tab extending radially outwardly from the anti-rotation rib, the support plate having a support plate hole aligned with the at least one first flange hole and with the at least one second flange hole; and a fastener extending through the support plate hole, through the at least one first flange hole, and through the at least one second flange hole.

There is disclosed a method of strengthening a flange of an engine casing, the method comprising: abutting a support plate against a portion of the flange having a flange hole; aligning a support plate hole with the flange hole by abutting an outer end of the support plate against an outer wall of the flange, and by having part of the support plate protrude radially outwardly from the outer wall of the flange; and securing the support plate to the portion of the flange.

DESCRIPTION OF THE DRAWINGS

Reference is now made to the accompanying figures in which.

DETAILED DESCRIPTION

Figure 1:
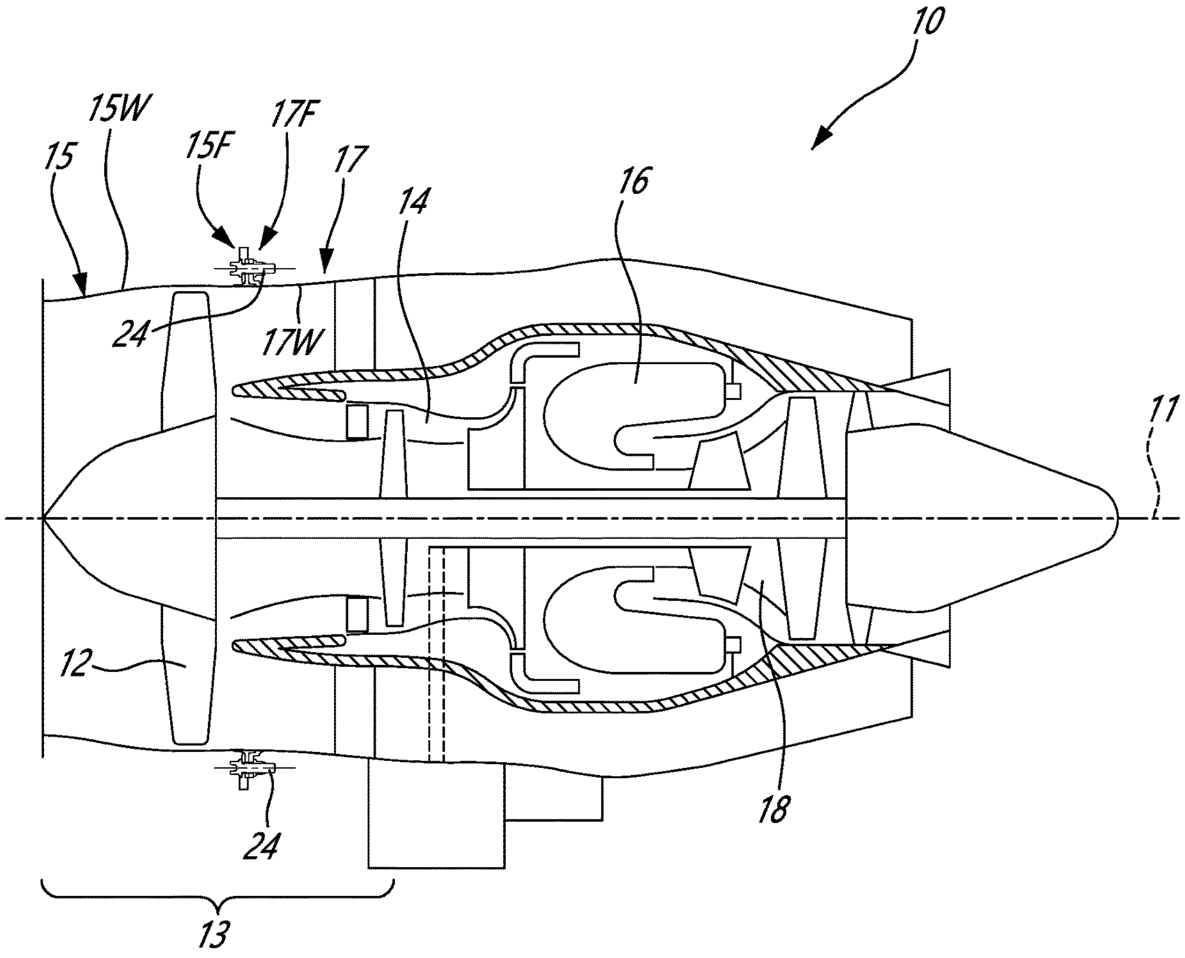
FIG. 1 is a schematic cross sectional view of a gas turbine engine having casings.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Some of the components of the gas turbine engine 10 are rotatable about a longitudinal center axis 11.

The gas turbine engine 10 includes a casing assembly 13. The casing assembly 13 is an annular body housing within its interior one or more components of the gas turbine engine 10, such as the fan 12. The casing assembly 13 is formed by attaching two components together — a first casing 15 and a second casing 17. One or both of the first and second casings 15,17 may be made up of interconnected casing sections or segments. Referring to FIG. 1, the casing assembly 13 surrounds the fan 12 of the gas turbine engine 10, and may thus be referred to as a "fan casing" or a "fan casing assembly". The casing assembly 13 in alternate embodiments may enclose or surround other components of the gas turbine engine 10. The specific size, shape, and configuration of the casing assembly 13, as described and/or illustrated herein, is exemplary only. Accordingly, the specific size, shape, and/or configuration of the casing assembly 13 generally, as well as portions thereof, may be selected to accommodate other components than the first and second casings 15,17.

Referring to FIG. 1, the first casing 15 includes and is defined by an annular first casing wall 15W, and the second casing 17 includes and is defined by an annular second casing wall 17W. The first casing 15 includes a first flange 15F and the second casing 17 includes a second flange 17F. The first and second flanges 15F,17F extend substantially radially outwardly with respect to the center axis 11 from their respective casing walls 15W,17W. Alternatively, depending on the application of the casing assembly 13, each of the first and second flanges 15F,17F may be oriented at any angle relative to each respective casing wall 15W, 17W, or may extend from any other component, that enables the casing assembly 13 to function. In an embodiment, one or both of the first and second flanges 15F,17F is a continuous body extending circumferentially relative to the center axis 11 around their respective casing walls 15W,17W. In another embodiment, one or both of the first and second flanges 15F,17F includes, or is made up of, discrete flange segments having a circumferential extent relative to the center axis 11.

Referring to FIG. 1, the first and second casings 15,17 are secured together by being coupled along the interface of the first and second flanges 15F,17F. The first and second flanges 15F,17F are abutted together to mate along surfaces of the flanges 15F,17F, bolts 24 are inserted through aligned holes in the first and second flanges 15F,17F, and the bolts are subsequently tightened to secure the mating first and second flanges 15F,17F together, as explained in greater detail below with reference to FIGS. 2A and 2B.

Figure 2A:
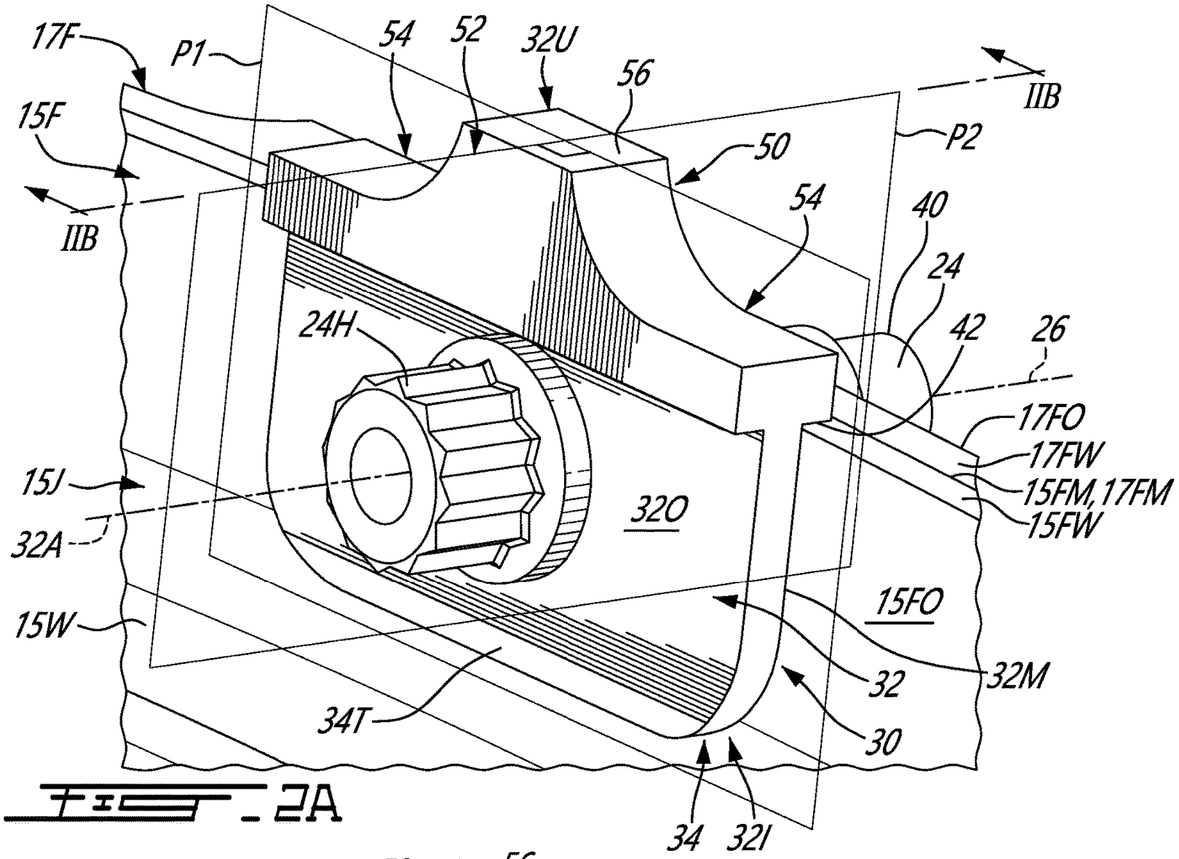
FIG. 2A is a perspective view of a support plate mounted to flanges of the casings of FIG. 1.
Figure 2B:
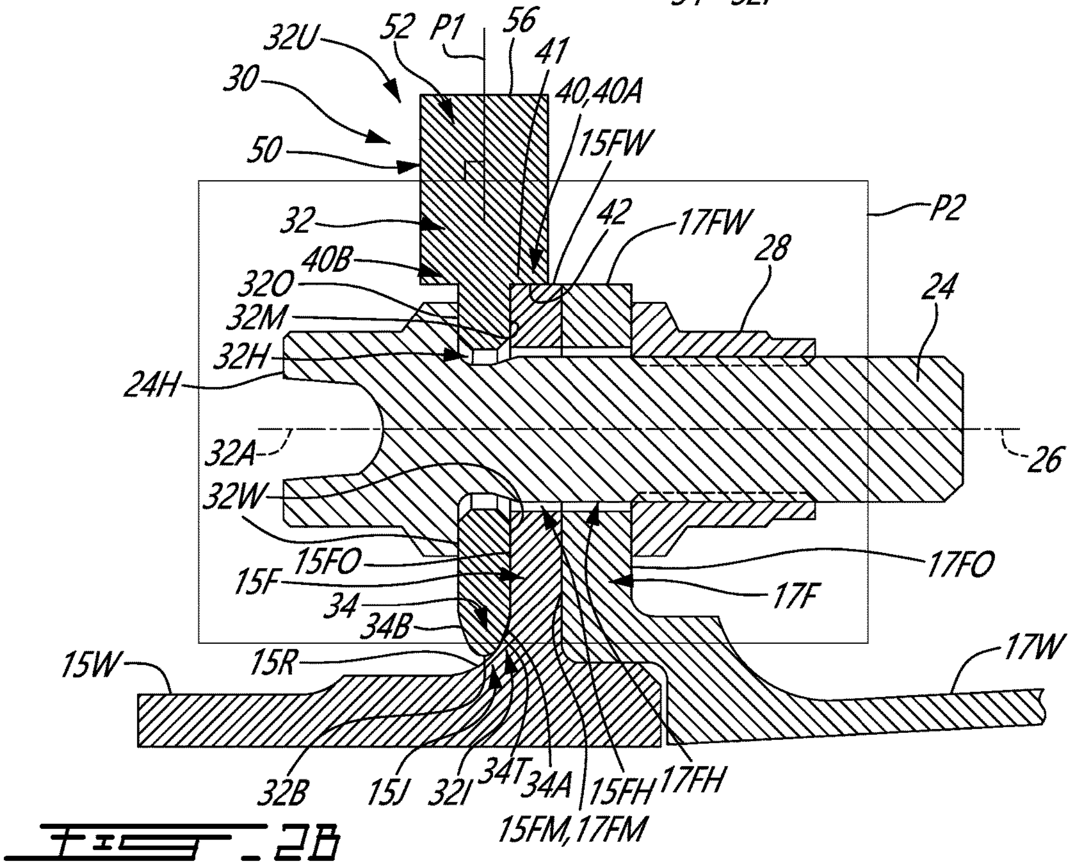
FIG. 2B is a cross-sectional view of the support plate and flanges taken along line IIB-IIB in FIG. 2A.

Referring to FIGS. 2A and 2B, the first flange 15F includes a first flange hole 15FH and the second flange 17F includes a second flange hole 17FH. The first and second flange holes 15FH,17FH are configured to receive a flange bolt, or simply one of the bolts 24. The bolt 24 is inserted through each flange hole 15FH,17FH. Some or all of the first and second flange holes 15FH,17FH are aligned along a hole center axis 26 of the flange holes 15FH,17FH. The bolt 24 is securely fastened with a nut 28. An optional washer or spacer may be inserted over the bolt 24 and paired with the nut 28. The first flange 15F defines a first flange mating surface 15FM and an oppositely disposed first flange opposite surface 15FO. The second flange 17F defines a second flange mating surface 17FM and an oppositely disposed second flange opposite surface 17FO. The first flange mating surface 15FM abuts against the second flange mating surface 17FM when the first and second flanges 15F,17F are coupled together. Referring to FIGS. 2A and 2B, at least a portion of first and second flange mating surfaces 15FM,17FM is substantially parallel to at least a portion of each respective opposite flange surface 15FO,17FO. Each flange hole 15FH, 17FH, respectively, extends between each respective mating surface 15FM,17FM and each opposite surface 15FO,17FO.

Referring to FIGS. 2A and 2B, the first flange 15F has a generally rectangular cross-sectional profile and is formed such that the first flange mating surface 15FM extends from an outer flange wall 15FW of the first flange 15F to the first casing wall 15W. The outer flange wall 15FW in FIGS. 2A and 2B is the radially-outermost portion of the first flange 15F relative to the center axes 11,26. The outer flange wall 15FW in FIGS. 2A and 2B defines the radially-outermost surface of the first flange 15F relative the center axes 11,26. Referring to FIGS. 2A and 2B, the first flange mating surface 15FM is substantially parallel to the first flange opposite surface 15FO, and the center axis 26 of the first flange hole 15FH is oriented substantially perpendicularly to the surfaces 15FM,15FO. The first flange hole 15FH is positioned radially inwardly of the outer flange wall 15FW, with respect to the hole center axis 26. Similarly, the second flange mating surface 17FM extends from a radially-outer wall of the second flange 17F to the second casing wall 17W, and is substantially perpendicular to the second casing wall 17W.

Referring to FIGS. 2A and 2B, the first casing wall 15W and the first flange 15F meet at a joint 15J. The joint 15J has, or is composed of, a fillet 15R. The fillet 15R is a rounding of the corner of the joint 15J and is defined by a radius and curvature. The fillet 15R forms the transition between the first casing wall 15W and the first flange 15F. The fillet 15R is along, and forms part of, the first flange opposite surface 15FO and is positioned opposite to the first flange mating surface 15FM.

During operation of the gas turbine engines 10, loads are generated and may act on the casing assembly 13. For example, in the configuration where the casing assembly 13 encloses the fan 12 of the gas turbine engine 10, a high event load such as fan blade off, in which a fan blade separates from the fan 12 and impacts the casing assembly 13, may cause stress to the casings 15,17 and/or to their flanges 15F,17F. It has been observed that such high event loads, in addition to more routine loads imparting stresses over multiple operating cycles of the gas turbine engine 10, may place the flanges 15F,17F under tensile loads and cause one or both of them to "peel" apart (i.e. to separate from each other), or may cause their flange holes 15FH,17FH to distort in shape.

In order to compensate for any such anticipated loading, or to reinforce a flange 15F,17F that may have already experienced the effects of such loading, the casing assembly 13 is provided with one or more support plates 30. The support plates 30 may be added to an existing flange 15F,17F that requires additional structural support or reinforcement against loads which may cause distortion of the flange holes 15FH,17FH or separation of the flanges 15F,17F under high event loads. The support plates 30 allow for strengthening a flange 15F,17F of the gas turbine engine 10 around the flange hole 15FH,17FH without having to remove the casing 15,17 containing the flange 15F,17F for repair or replacement. By reinforcing or strengthening a flange 15F,17F, the support plates 30 may allow for running the gas turbine engine 10 at loads higher than those for which the flange 15F,17F was designed, and thereby possibly allow for continued use of the flange 15F,17F without having to re-engineer it or the casing 15,17.

Referring to FIGS. 2A and 2B, the support plate 30 has a body 32. The body 32 is a planar rectangular prism which has a thickness defined between a first side 32M and a second side 32O that is opposite to the first side 32M. The body 32 also has a height defined between an outer end 32U and an inner end 32I. The body 32 has a support plate hole 32H that extends through the body between the first and second sides 32M,32O. The support plate hole 32H is centered about a plate center axis 32A of the body 32. The first and second sides 32M,32O are spaced apart from each other in an axial direction relative to the plate center axis 32A. The outer and inner ends 32O,32I are spaced apart from each other in a radial direction relative to the plate center axis 32A, to define the height of the body 32.

In the configuration of the support plate 30 in FIGS. 2A and 2B, the support plate 30 is a "single-hole" support plate 30 because it has only one support plate hole 32H. The single-hole support plate 30 increases the versatility of the support plate 30, because it allows the support plate 30 to be used to reinforce any single flange hole 15FH,17FH, which may be desirable for flanges 15F,17F that do not have repeating hole patterns. The versatility provided by the single-hole support plate 30 may also allow it to be used to reinforce the flange 15F,17F at "empty" flange holes 15FH, 17FH that are not already occupied by harness brackets or the like. However, other configurations of the support plate 30 are possible and within the scope of the present disclosure. For example, in another possible configuration of the support plate 30, the support plate 30 has multiple support plate holes 32H and is used to reinforce a flange 15F,17F which has a repeating hole pattern. This configuration of the support plate 30 may include an annular or ring body 32, or a circumferentially-elongated body 32, each of which has multiple support plate holes 32H which are circumferentially spaced apart.

FIGS. 2A and 2B show the support plate 30 mounted and secured against the first flange 15F of the first casing 15. When mounted to the first flange 15F, the first side 32M of the body 32 abuts against, and mates with, the first flange opposite surface 15FO and is parallel with the first flange mating surface 15FM. When mounted to the first flange 15F, the outer end 32U is the radially-outer end of the body 32 relative to the hole center axes 26, and the inner end 32I is the radially-inner end of the body 32 and is positioned closer to the first casing wall 15W than the outer end 32U. When mounted to the first flange 15F, the support plate hole 32H is aligned with the first and second flange holes 15FH,17FH such that the plate center axis 32A is collinear with the hole center axes 26 of the first and second flange holes 15FH, 17FH. The bolt 24 is inserted through the support plate hole 32H, through the first flange hole 15FH, and through the second flange hole 17FH. The support plate 30 is secured to the first flange 15F by being fastened to the first flange 15F with the bolt 24, and by tightening the bolt 24. A bolt head 24H abuts against the second side 32O of the body 32.

Figure 5:
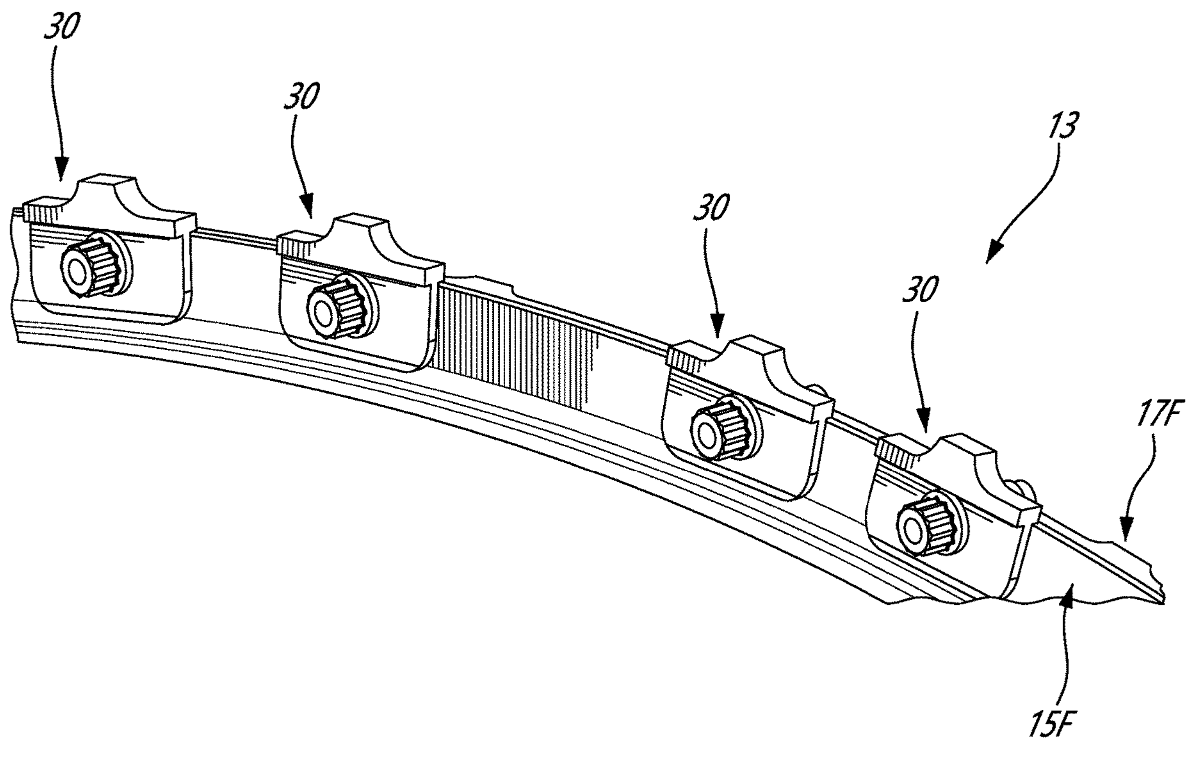
FIG. 5 is a perspective view of multiple support plates mounted to flanges of the casings of FIG. 1.

Although FIGS. 2A and 2B show one support plate 30 secured to the first and second flanges 15F,17F around one pair of their flange holes 15H,17H, the casing assembly 13 may have multiple support plates 30 each secured to a corresponding pair of first and second flange holes 15FH, 17FH. One possible example of such a configuration is shown in FIG. 5. FIG. 5 is an example of casing assembly 13 in which the flanges 15F,17F do not have repeating hole patterns. Furthermore, although FIGS. 2A and 2B show a single-hole support plate 30, the support plate 30 may have multiple support plate holes 32H, each of which is aligned with one pair of aligned flange holes 15FH,17FH of the flanges 15F,17F. In the configuration of the flanges 15F,17F in FIGS. 2A and 2B, the first flange 15F is thinner than the second flange 17F (when measured along an axial direction relative to the aligned center axes 26), such that only one support plate 30 may be needed to reinforce the casing assembly 13 at the first flange 15F, the second flange 17F being potentially thick enough to adequately resist bending or peeling. However, the casing assembly 13 in another embodiment has a second support plate 30 secured to the second flange 17F, either in addition to the first support plate 30 secured to the first flange 15F or not. Therefore, the description herein related to the support plate 30 and its features secured to the first flange 15F applies mutatis mutandis to a second support plate 30 secured to the second flange 17F.

The support plate 30 has one or more features which help to orient it correctly with respect to the first flange 15F, and which prevent it from being installed incorrectly on the first flange 15F. Some of these features are now described in greater detail.

Referring to FIGS. 2A and 2B, one of these features is an anti-rotation rib 40 of the support plate 30. The anti-rotation rib 40 helps to prevent the support plate 30 from rotating about the plate center axis 32A when it is being applied against the first flange 15F and secured in place by torqueing the bolt 24. The anti-rotation rib 40 (sometimes referred to herein simply as the "rib 40") thus helps the support plate 30 to have the correct orientation when the support plate 30 is being secured to the first flange 15F. The rib 40 also helps to prevent the support plate 30 from being installed incorrectly on the flange 15F by helping to ensure that the support plate 30 has the correct orientation. The rib 30 thus contributes to making the support plate 30 "mistake-proof", or less prone to being installed incorrectly.

The rib 40 may have any suitable shape or form to achieve such functionality. For example, and referring to FIGS. 2A and 2B, the rib 40 includes a body 41 that has a height measured radially relative to the plate center axis 32A. The body 41 has a rib wall 42 that lies in a single straight plane (or possible a singly slightly curved plane). The rib 40 has a circumferential extent relative to the hole center axes 26 when the support plate 30 is installed on the first flange 15F, and is present on opposite circumferential sides of the hole center axes 26. The rib 40 is positioned between the outer and inner ends 32U,32I of the body 32 of the support plate 30. The rib 40 is located on the first side 32M of the body 32, and extends transversely to the first side 32M toward the first flange 15F.

In order to achieve its anti-rotation function, the rib 40 abuts against the outer flange wall 15FW of the first flange 15F when the support plate 30 is positioned against the first flange 15F. Referring to the configuration of the rib 40 in FIGS. 2A and 2B, the rib wall 42 defines or forms a radially-innermost surface of the rib 40, relative to the hole center axes 26. This radially-innermost surface abuts against, and mates with, part of the outer flange wall 15FW overlying the first flange hole 15FH. The outer flange wall 15FW forms an exposed, radially-outermost surface of the first flange 15F relative to the hole center axes 26. The rib 40 is thus positioned radially outwardly of the outer flange wall 15FW, relative to the hole center axes 26, when the support plate 30 is placed against the first flange 15F. The abutment of the rib wall 42 against the outer flange wall 15FW stops the support plate 30 from rotating about the plate center axis 32A when the bolt 24 is torqued. The anti-rotation functionality provided by the rib 40 may be beneficial to the single-hole support plate 30 of FIGS. 2A and 2B, which may have a greater tendency to rotate about the plate center axis 32A when the bolt 24 is torqued. The configuration of the rib 40 in FIGS. 2A and 2B shows the rib 40 extending over and overlaying most of the outer flange wall 15FW in an axial direction relative to the hole center axes 26. In another possible configuration of the rib 40, the rib 40 is axially longer than shown in FIGS. 2A and 2B such that it extends axially over and overlays both the outer flange wall 15FW of the first flange 15F and some or all of the outer flange wall 17FW of the second flange 17F, such that the rib 40 abuts both flanges 15F,17F.

FIGS. 2A and 2B show another feature of the support plate 30, a misalignment tab 50, which helps to orient the support plate 30 correctly with respect to the first flange 15F, and which prevents it from being installed incorrectly on the first flange 15F. The misalignment tab 50 helps to prevent the plate center axis 32A from aligning with the hole center axis 26 of the first flange 15F when the support plate 30 is incorrectly oriented with respect to the first flange 15F, as explained in greater detail below. Since the center axes 32A,26 are misaligned when the support plate 30 is incorrectly oriented, the misalignment tab 50 helps to prevent the support plate 30 from being installed incorrectly on the first flange 15F because the bolt 24 cannot be inserted through the misaligned support plate and first flange holes 32H, 15FH. The misalignment tab 50 (sometimes referred to herein simply as the "tab 50") thus helps the support plate 30 to have the correct orientation when the support plate 30 is being secured to the first flange 15F. The tab 50 also helps to prevent the support plate 30 from being installed incorrectly on the flange 15F, thereby helping to make the support plate 30 "mistake-proof", or less prone to being installed incorrectly.

The tab 50 may have any suitable shape or form to achieve such functionality. For example, and referring to FIGS. 2A and 2B, the tab 50 extends radially outwardly from the rib 40, relative to the plate center axis 32A. The tab 50 is positioned radially outwardly of the support plate hole 32H, relative to the plate center axis 32A. The tab 50 thus forms a radially-outward extension of the support plate 30, such that part of the support plate 30 (i.e. the tab 50) protrudes radially outwardly from the outer flange wall 15W when the support plate 30 is secured to the first flange 15F. The height of the tab 50 (measured along a direction radial to the plate center axis 32A) contributes to misaligning the holes 32H,15FH when the support plate 30 is incorrectly oriented with respect to the first flange 15F. In the configuration of the tab 50 shown in FIGS. 2A and 2B, the tab 50 has a circumferential extent relative to the hole center axes 26 when the support plate 30 is installed on the first flange 15F, and is present directly radially outwardly of the holes 32H,15FH and radially aligned therewith when the support plate 30 is secured to the first flange 15F. The tab 50 is centered on the support plate 30. The tab 50 is positioned at the outer end 32U of the body 32 of the support plate 30, and defines the radially-outermost surface of the support plate 30, relative to the hole center axes 26, when the support plate 30 is secured to the first flange 15F.

Referring to the configuration of the tab 50 in FIGS. 2A and 2B, the tab 50 includes one or more protruding portions 52 and one or more recessed portions 54. The protruding portion 52 is positioned radially outwardly of the recessed portions 54 relative to the plate center axis 32A. The protruding portion 52 is thus a bump forming the outer end 32U of the support plate 30 which helps to prevent the holes 32H,15FH from aligning when the support plate 30 is incorrectly oriented with respect to the first flange 15F, as explained in greater detail below. Referring to the configuration of the tab 50 in FIGS. 2A and 2B, the tab 50 defines a outer tab wall 56 which defines the radially-outermost surface of the support plate 30, relative to the aligned axes 32A,26 when the support plate 30 is secured to the first flange 15F. The outer tab wall 56 along the recessed portions 54 is positioned radially closer to the plate center axis 32A than the outer tab wall 56 along the protruding portion 52. The outer tab wall 56 along the protruding portion 52 lies in a single straight plane that is perpendicular to a line being radial to the plate center axis 32A. The outer tab wall 56 along the recessed portions 54 lies in a curved plane that slopes toward the plate center axis 32A from the outer tab wall 56 along the protruding portion 52. In one possible configuration, the protruding portion 52 has a height measured along a radial line from the plate center axis 32A that is greater than a distance between the first casing wall 15W and the radially-innermost surface of the first flange hole 15. In another possible configuration, the protruding portion 52 has a height measured along a radial line from the plate center axis 32A that is less than half the distance between the first casing wall 15W and the radially-innermost surface of the first flange hole 15. It will thus be appreciated that the height of the tab 50 may be any value which causes misalignment of the holes 32H,15FH when the support plate 30 is incorrectly oriented with respect to the first flange 15F. Determining the height of the tab 50 may involve identifying the scenarios where the bolt 24 may still be inserted through the misaligned holes 32H,15FH, and selecting the height to avoid these scenarios.

Figure 6:
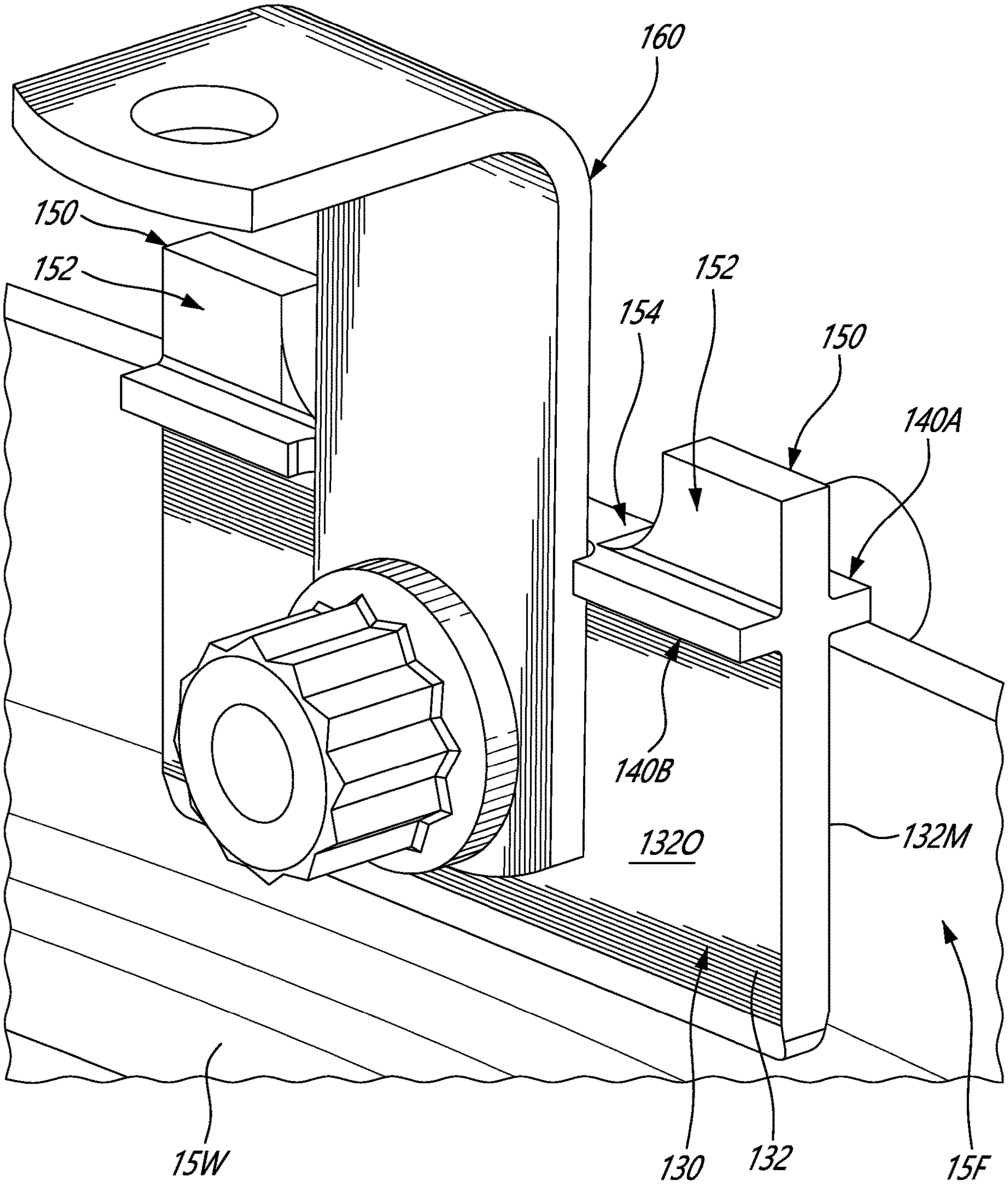
FIG. 6 is a perspective view of another support plate mounted to a flange of a casing of FIG. 1.

Other configurations for the tab 50 are possible. For example, the tab 50 in another possible configuration has only a single protruding portion 52 and no recessed portions 54. For example, in another possible configuration of the support plate 130 and referring to FIG. 6, the tab 150 has two protruding portions 152 on opposite circumferential ends of the body 132, where the protruding portions 152 are spaced apart by a single recessed portion 154. In the configuration of FIG. 6, the tab 150 is on either end of the support plate 130, such that the recessed portion 154 provides a clearance which allows for a bracket 160 to be attached to the support plate 130. The bracket 160 may be used to attach objects such as a wiring harness to the support plate 130, and thus to the first flange 15F.

Figure 3:
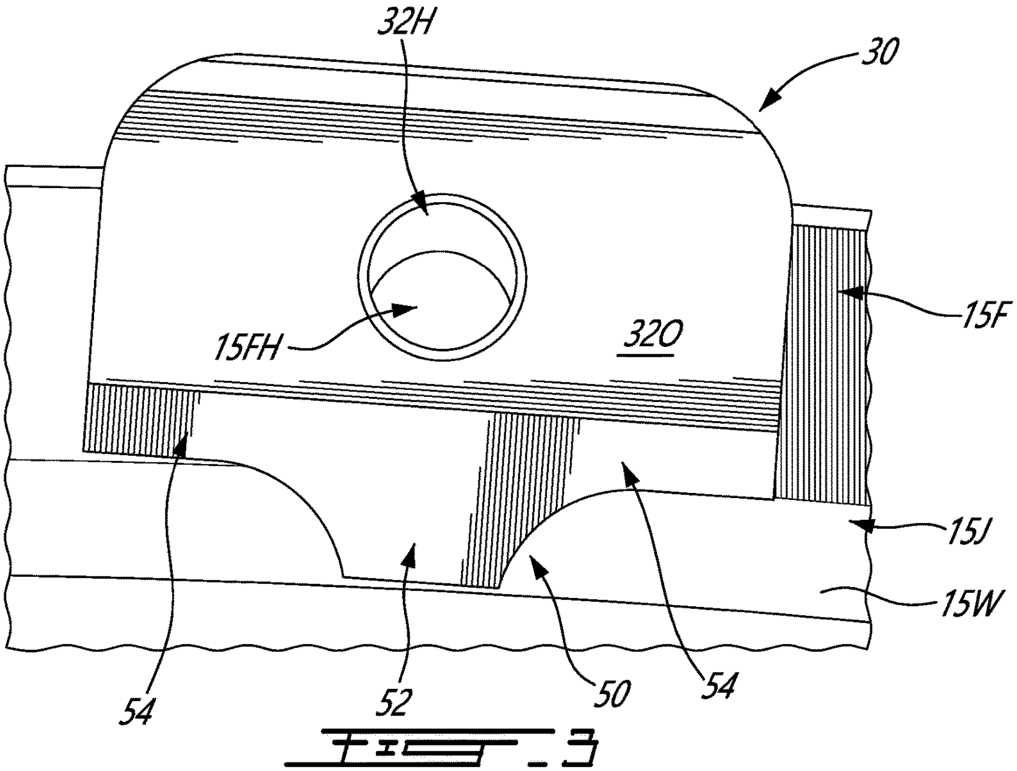
FIG. 3 is a side elevational view of the support plate of FIG. 2A incorrectly positioned with respect to the flange.
Figure 4A:
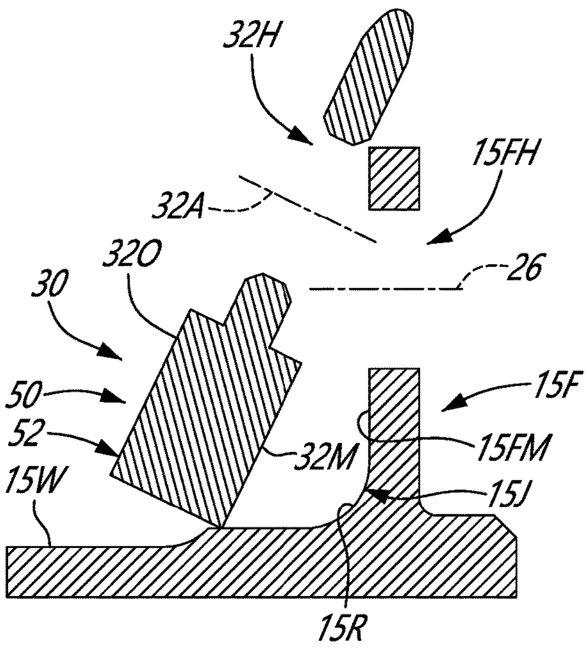
FIG. 4A is a cross-sectional view of the support plate of FIG. 2A being incorrectly positioned with respect to the flange.
Figure 4B:
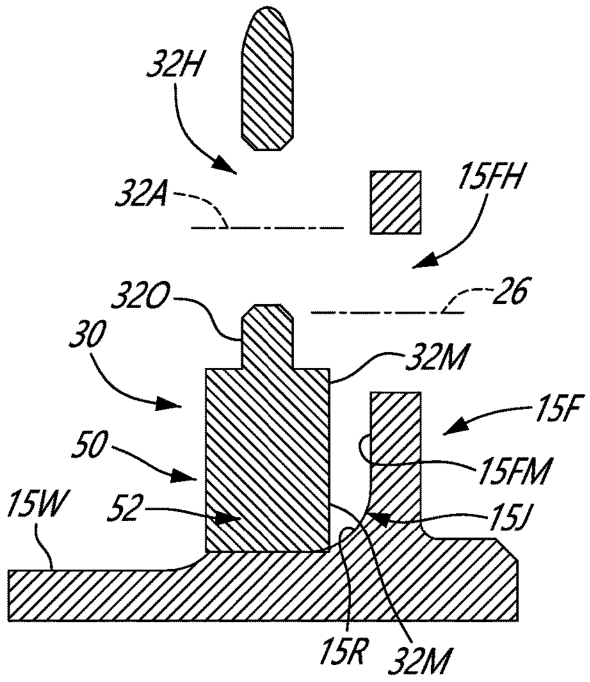
FIG. 4B is a cross-sectional view of the support plate of FIG. 2A incorrectly positioned adjacent to the flange.

The ability of the misalignment tab 50 to orient the support plate 30 correctly with respect to the first flange 15F, and to prevent the support plate 30 from being installed incorrectly on the first flange 15F, may be better appreciated with reference to FIGS. 3 to 4B. The support plate 30 is shown in FIGS. 3 to 4B in an incorrect orientation with respect to the first flange 15F, in which the tab 50 is positioned "upside down" (i.e. abutting the first casing wall 15W). When the support plate 30 is positioned incorrectly with respect to the first flange 15F, FIGS. 3 and 4B show that the protruding portion 52 of the tab 50 prevents the plate center axis 32A from aligning with the hole center axis 26. Thus, the tab 50 stops the support plate and first flange holes 32H,15FH from being aligned when the support plate 30 is positioned incorrectly with respect to the first flange 15F, such that the bolt 24 is prevented from being inserted into the holes 32H,15FH and thus the support plate 30 cannot be secured to the first flange 15F. The installer will only be able to secure the support plate 30 to the first flange 15F by flipping the support plate 30 so that the misalignment tab 50 is radially outward. In this way, the misalignment tab 50 contributes to making the support plate 30 "mistake proof", because it allows the support plate 30 to be secured to the first flange 15F only when the support plate 30 has the correct orientation.

Another misalignment or mistake-proof feature of the tab 50 is also shown in FIGS. 4A and 4B. The edges of the protrusion portion 52 of the tap 50 are straight and free of bevels or chamfers. These straight edges prevent the first side 32M of the support plate 30 from being placed flush against the first flange mating surface 15FM of the first flange 15F, because the straight edges of the protrusion portion 52 do not conform to the shape of the fillet 15R at the joint 15J between the first casing wall 15W and the first flange 15F. If the installer mistakenly moves the support plate 30 radially outward to place the first side 32M of the support plate 30 flush against the first flange mating surface 15FM, then the center axes 32A,26 will be misaligned such that the bolt 24 will not be able to be inserted through the support plate and first flange holes 32H,15FH.

Referring to FIGS. 2A and 2B, the support plate 30 and its mistake-proof features disclosed herein help reduce the possibility, and may even completely prevent, the incorrect installation of the support plate 30 against the first flange 15F. This allows for a substantially or completely "mistake-proof" assembly of the support plate 30 with the first flange 15F, such that the installer may perform such installation "blind" (i.e. without actually seeing the first flange 15F). Such a blind installation may be performed in an aircraft engine 10 which is still mounted to a wing of the aircraft, and in which it is difficult to see or access the first flange 15F. The inability to see the support plate 30 during its attachment to the first flange 15F, which might otherwise have prevented the installation of the support plate 30 or required dismounting the engine 10, may no longer be an impediment to the installer from completing the work, because the mistake-proof features of the support plate 30 may allow the installer to still correctly attach the support plate 30 to the first flange 15F and thereby reinforce the first flange 15F.

Referring to FIGS. 2A and 2B, when properly installed against the first flange 15F, the support plate 30 helps to structurally reinforce or strengthen the first flange 15F. The inner end 32I of the body 32 of the support plate 30 is chamfered, or has a chamfer 34. One or both sides 32M,32O of the body 32 at the inner end 32I has a transitional wall 34T of the chamfer 34. The transitional wall 34T extends between a side wall 32W of the body 32 on the first or second sides 32M,32O and a bottom wall 32B of the body 32 defining the radially-innermost surface of the body 32 relative to the aligned axes 32A,26. The transitional wall 34T may be a bevel, radius or any other surface that is shaped to be complementary to a shape of the fillet 15R, so that the chamfer 34 can be abutted against, and mate with, the fillet 15R at the joint 15J between the first casing wall 15W and the first flange 15F. For example, in the configuration of the support plate 30 in FIGS. 2A and 2B, the transitional wall 34T is curved over its length, such that chamfer 34 is defined by a radius of curvature that matches or is similar to a radius of curvature of the fillet 15R. The curvature of the chamfer 34 is complementary to the curvature of the fillet 15R (e.g. the chamfer 34 has a convex curvature matching the concave curvature of the fillet 15R), so that they can be mated together.

The complementary shapes between the chamfer 34 and the fillet 15R may allow for tension loads acting on the casing walls 15W,17W to be transferred to the support plate 30 at the chamfer 34. The chamfer 34 allows the inner end 32I of the support plate 30 to bear a portion of the load along the fillet 15R and parts of the casing wall 15W proximate the fillet 15R. The chamfer 34 may thus provide additional load bearing capacity to the support plate 30. By reinforcing the joint 15J between the first casing wall 15W and the first flange 15F, the chamfer 34 of the support plate 30 helps to reinforce the fillet 15R during flange loading, and may reduce the tension loads causing the flanges 15F,17F to "peel" apart (i.e. to separate from each other). By abutting against the joint 15J at the fillet 15R, the chamfer 34 may help to lower bending at the flange 15F,17F. The complementary shapes between the chamfer 34 and the fillet 15R may allow for clearances or gaps between the support plate 30 and the fillet 15R to be minimized or eliminated, helping to ensure that the support plate 30 can be installed flush with the first flange 15F and thus will not interfere with the fillet 15R which might impact the bolt clamp stack.

Referring to FIGS. 2A and 2B, the body 32 of the support plate 30 is symmetrical. As explained in greater detail below, the symmetry of the support plate 30 contributes to its mistake-proof attributes. The support plate 30 defines a first support plate plane P1. The first support plate plane P1 is parallel to the first flange 15F when the support plate 30 is secured to the first flange 15F. The first support plate plane P1 is parallel to the first flange mating and opposite surfaces 15FM,15FO of the first flange 15F when the support plate 30 is secured to the first flange 15F. The first support plate plane P1 (sometimes referred to herein simply as "the first plane P1") extends through the body 32 of the support plate 30. The first plane P1 extends through the body 32 of the support plate 30 between the first side 32M and the second side 32O. The first plane P1 extends through the body 32 of the support plate 30 between the first side 32M and the second side 32O, and is spaced equidistantly from the first and second dies 32M,32O. The first plane P1 is parallel to the first side 32M and the second side 32O. The first plane P1 is perpendicular to the plate center axis 32A. The first plane P1 is perpendicular to the aligned center axes 32A,26 when the support plate 30 is secured to the first flange 15F.

The support plate 30 defines a second support plate plane P2. The second support plate plane P2 is perpendicular to the first flange 15F when the support plate 30 is secured to the first flange 15F. The second support plate plane P2 is perpendicular to the first flange mating and opposite surfaces 15FM,15FO of the first flange 15F when the support plate 30 is secured to the first flange 15F. The second support plate plane P2 (sometimes referred to herein simply as "the second plane P2") extends through the body 32 of the support plate 30. The second plane P2 contains the plate center axis 32A of the body 32, extends radially from the plate center axis 32A, and has an upright or vertical orientation when the support plate 30 is secured to the first flange 15F. The second plane P2 is perpendicular to the first plane P1. The second plane P2 is perpendicular to the first and second sides 32M,32O of the body 32. The second plane P2 may be considered to be a center plane because it contains the plate center axis 32A.

Some of the mistake-proof features of the support plate 30 are symmetrical about one or both of the first and second planes P1,P2. For example, and referring to FIG. 2B, the rib 40 includes a first rib 40A and a second rib 40B. The first and second ribs 40A,40B extend from the body 32 in a direction that is perpendicular to the first plane P1. The first rib 40A extends from the first side 32M of the body 32 in a direction that is perpendicular to the first plane P1 and also extends toward the outer flange wall 15FW. The first rib 40A is thus able to jut out over, and abut against, the outer flange wall 15FW. The second rib 40B extends from the second side 32O of the body 32 in a direction that is perpendicular to the first plane P1 and also extends away from the outer flange wall 15FW. Referring to FIG. 2B, the first and second anti-rotation ribs 40A,40B are symmetric about the first plane P1. The first and second ribs 40A,40B have reflectional symmetry (i.e. line or mirror symmetry), in that the first support plate plane P1 bisects the body 32 of the support plate 30, dividing it into two pieces in which the ribs 40A,40B are mirror images of each other. The symmetry of the ribs 40A,40B about the first plane P1 and their presence on both sides 32M,32O of the support plate 30 helps to ensure that the support plate 30 will be correctly positioned against the first flange 15F, because the installer can abut either side 32M,32O of the support plate 30 against the first flange 15F. This contributes to the mistake-proof attributes of the support plate 30, and further assists with a blind installation of the support plate 30.

Another of the mistake-proof features of the support plate 30 that is symmetrical about one or both of the first and second planes P1,P2 is the misalignment tab 50. For example, and referring to FIG. 2A, the tab 50 is symmetric about the second plane P2. Referring to FIG. 2, the protruding and recessed portions 52,54 of the tab 50 are symmetric about the second plane P2. The tab 50 has reflectional symmetry (i.e. line or mirror symmetry), in that the second support plate plane P2 bisects the body 32 of the support plate 30, dividing it into two pieces in which the protruding and recessed portions 52,54 are mirror images of each other. The symmetry of the tab 50 about the second plane P2 helps to ensure that the support plate 30 will be correctly positioned against the first flange 15F, because the installer can abut either side 32M,32O of the support plate 30 against the first flange 15F. This contributes to the mistake-proof attributes of the support plate 30, and further assists with a blind installation of the support plate 30.

Another of the mistake-proof features of the support plate 30 that is symmetrical about one or both of the first and second planes P1,P2 is the chamfer 34. For example, and referring to FIG. 2B, the chamfer 34 includes a first chamfer 34A and a second chamfer 34B. The first and second chamfers 34A,34B are at the inner end 32I. The first and second chamfers 34A,34B are shaped such that their transitional walls 34T slow toward the first plane P1 from the side walls 32W of the body, and also slope toward each other. The first chamfer 34A is present on the first side 32M of the body 32, and the second chamfer 34B is present on the second side 32O of the body 32. The first and second chamfers 34A,34B are symmetric about the first plane P1. Referring to FIG. 2B, the first and second chamfers 34A,34B have reflectional symmetry (i.e. line or mirror symmetry), in that the first support plate plane P1 bisects the body 32 of the support plate 30, dividing it into two pieces in which the chamfers 34A,34B are mirror images of each other. The symmetry of the chamfers 34A,34B about the first plane P1 and their presence on both sides 32M,32O of the support plate 30 (i.e a "double chamfer" at the inner end 32I) helps to ensure that the support plate 30 will be correctly positioned against the first flange 15F, because the installer can abut either side 32M,32O of the support plate 30 against the first flange 15F. This contributes to the mistake-proof attributes of the support plate 30, and further assists with a blind installation of the support plate 30.

The support plate 30 thus has features that are symmetrical in perpendicular planes P1,P2 of the support plate 30. This symmetry contributes to making the support plate 30 mistake proof, because it allows for either side 32M,32O of the support plate 30 to be installed against the first flange 15F. This symmetry of the support plate 30, in combination with the anti-rotation rib 40 and the misalignment tab 50, helps to prevent installation of the bolt 24 until the support plate 30 is positioned in the correct configuration to reinforce the structural integrity of the first flange 15F.

Referring to another possible configuration of the support plate 130 in FIG. 6, the first and second ribs 140A,140B extend perpendicularly outwardly from their respective sides 132M,132O of the body 132 of the support plate 130. The two protruding portions 152 of the tab 150 are spaced inwardly toward the middle of the body 132 from the first and second ribs 140A,140B. The features of the support plate 130 shown in FIG. 6 have the same symmetry about the first and second planes P1,P2 described above. The description provided above of the features of the support plate 30 and their attributes applies mutatis mutandis to the features of the support plate 130 in FIG. 6.

In operation, and referring to FIGS. 2A and 2B, the support plate 30,130 may be attached to the first flange 15F as follows. The installer first abuts either side 32M,32O of the body 32 against the first flange mating surface 15FM. If the installer feels or observes that the body 32 is not flush against the first flange mating surface 15FM, they installer may move the body 32 until 1) one of the ribs 40A,40B is abutting against the outer flange wall 15FW, 2) the protruding portion 52 of the misalignment tab 50 extends radially outwardly of the outer flange wall 15FW, and 3) one of the chamfers 34A,34B is flush against the fillet 15R of the joint 15J between the first casing wall 15W and the first flange 15F. The holes 32H,15FH will only be aligned if all three of these events occur, such that the support plate 30,130 can only be secured to the first flange 15F with the bolt 24 in the correct position when all three of these events have occurred.

Referring to FIGS. 2A and 2B, there is disclosed a method of reinforcing or strengthening the flange 15F of the casing 15. The method includes abutting the support plate 30,130 against a portion of the flange 15F. The method includes aligning the support plate hole 32H with the flange hole 15FH by abutting an outer end of the support plate 30,130 against the outer flange wall 15FW, and by having part of the support plate 30,130 protrude radially outwardly from the outer flange wall 15W. The method includes securing the support plate 30,130 to the portion of the flange 15F. There is also disclosed a method of retrofitting a flange 15F of an engine casing 15 with the support plate 30,130, based on the disclosure herein. There is also disclosed a method of repairing a flange 15F of an engine casing 15 with the support plate 30,130, based on the disclosure herein. These methods may include inspecting the flange 15F for damage, and validating the installation of the support plate 30,130, such as with a stress engineer. There is also disclosed a method of blindly installing a support plate 30,130 on a flange 15F of an engine casing 15, based on the disclosure herein. There is also disclosed a method of replacing an existing support plate on a flange 15F of an engine casing 15 using the support plate 30,130 disclosed herein, based on the disclosure herein. These methods may include preventing the support plate 30,130 from being secured in every or any orientation except a single orientation in which the support plate hole 32H is aligned with the flange hole 15FH.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine casing, comprising:

an annular casing wall defining a center axis, and a flange extending from the annular casing wall radially outwardly to an outer flange wall, the flange having a plurality of flange holes radially inward of the outer flange wall, each flange hole of the plurality of flange holes having a hole center axis;

a support plate against the flange, the support plate having an anti-rotation rib abutting the outer flange wall and a misalignment tab extending radially outwardly from the anti-rotation rib, the support plate having a support plate hole aligned with one flange hole of the plurality of flange holes;

wherein the anti-rotation rib has a radially-innermost surface mated with a radially-outermost surface of the outer flange wall, and wherein the anti-rotation rib extends continuously in a circumferential direction relative to the center axis of the annular casing wall from a first side of the support plate hole to a second side of the support plate hole opposite the first side thereof; and a fastener extending through the support plate hole and through the one flange hole of the plurality of flange holes, wherein the misalignment tab has a height measured along a radial line from a centerline axis of the support plate hole, and wherein the height is selected to prevent the centerline axis of the support plate hole from aligning with the hole center axis of the one flange hole of the plurality of flange holes when the support plate is incorrectly oriented with respect to the flange.

2. The aircraft engine casing of claim 1, wherein the support plate extends between an outer end and an inner end, the misalignment tab disposed at the outer end and the inner end being chamfered.

3. The aircraft engine casing of claim 1, wherein the annular casing wall and the flange meet at a joint having a fillet, the misalignment tab of the support plate disposed at an outer end of the support plate and the support plate having an inner end with a chamfer, the chamfer and the fillet abutting each other and having complementary shapes.

4. The aircraft engine casing of claim 1, wherein the support plate defines a first support plate plane parallel to the flange, the anti-rotation rib extending from the support plate toward the outer flange wall in a direction perpendicular to the first support plate plane.

5. The aircraft engine casing of claim 1, wherein the support plate defines a first support plate plane parallel to the flange and extending through the support plate, the anti-rotation rib including a first anti-rotation rib extending from the support plate toward the outer flange wall in a direction perpendicular to the first support plate plane, the anti-rotation rib including a second anti-rotation rib extending from the support plate away from the outer flange wall in the direction perpendicular to the first support plate plane.

6. The aircraft engine of claim 5, wherein the first and second anti-rotation ribs are symmetric about the first support plate plane.

7. The aircraft engine casing of claim 1, wherein the support plate defines a first support plate plane parallel to the flange and extending through the support plate, the misalignment tab of the support plate disposed at an outer end of the support plate and the support plate having an inner end with a first chamfer and a second chamfer, the first and second chamfers being symmetric about the first support plate plane.

8. The aircraft engine casing of claim 1, wherein the support plate defines a first support plate plane perpendicular to the centerline axis of the support plate hole, and a second support plate plane extending radially through the centerline axis of the support plate hole and perpendicular to the first support plate plane, the misalignment tab being symmetric about the second support plate plane.

9. The aircraft engine casing of claim 1, wherein the height of the misalignment tab is greater than a distance measured in a radial direction with respect to the center axis between the annular casing wall and a radially-innermost surface of the one flange hole.

10. The aircraft engine casing of claim 1, wherein the height of the misalignment tab is less than half a distance measured in a radial direction with respect to the center axis between the annular casing wall and a radially-innermost surface of the one flange hole of the plurality of flange holes.

11. A support plate system for an aircraft engine comprising:

an engine casing having an annular casing wall defining a center axis, a flange extending from the annular casing wall radially outwardly to an outer flange wall, the flange having a plurality of flange holes radially inward of the outer flange wall, each of the plurality of flange holes having a hole center axis; and a support plate against the flange, the support plate comprising:

a body having a first side and a second side opposite the first side, the body extending between an outer end and an inner end and defining a centerline axis of the support plate;

a support plate hole extending through the body between the first and second sides and about the centerline axis, the support plate hole aligned with one flange hole of the plurality of flange holes;

an anti-rotation rib on one or both of the first and second sides and disposed radially outwardly of the support plate hole, the anti-rotation rib abutting the outer flange wall;

wherein the anti-rotation rib has a radially-innermost surface mated with a radially-outermost surface of the outer flange wall, and wherein the anti-rotation rib extends continuously in a circumferential direction relative to the center axis of the annular casing wall from a first circumferential side of the support plate hole to a second circumferential side of the support plate hole opposite the first circumferential side thereof;

a fastener extending through the support plate hole and through the one flange hole of the plurality of flange holes; and a misalignment tab extending radially outwardly from the anti-rotation rib at the outer end, the misalignment tab having a radial height selected to prevent the centerline axis of the body of the support plate from aligning with the hole center axis of the one flange hole of the plurality of flange holes when the support plate is incorrectly oriented with respect to the flange.

12. The support plate system of claim 11, wherein the inner end is chamfered.

13. The support plate system of claim 11, wherein the body defines a first support plate plane perpendicular to the centerline axis and extending through the body between the first and second sides, the anti-rotation rib extending away from the one or both of the first and second sides in a direction perpendicular to the first support plate plane.

14. The support plate system of claim 11, wherein the body defines a first support plate plane perpendicular to the centerline axis and extending through the body between the first and second sides, the anti-rotation rib including a first anti-rotation rib extending away from the first side in a direction perpendicular to the first support plate plane, the anti-rotation rib including a second anti-rotation rib extending away from the second side and away from the first anti-rotation rib in the direction perpendicular to the first support plate plane.

15. The support plate system of claim 14, wherein the first and second anti-rotation ribs are symmetric about the first support plate plane.

16. The support plate system of claim 11, wherein the body defines a first support plate plane perpendicular to the centerline axis and extending through the body between the first and second sides, the inner end having a first chamfer and a second chamfer, the first and second chamfers being symmetric about the first support plate plane.

17. The support plate system of claim 11, the body defines a first support plate plane perpendicular to the centerline axis and extending through the body between the first and second sides, and a second support plate plane extending radially through the center axis and perpendicular to the first support plate plane, the misalignment tab being symmetric about the second support plate plane.

18. The support plate system of claim 11, wherein the misalignment tab includes at least one protruding portion and at least one recessed portion, the at least one protruding portion positioned radially outwardly of the at least one recessed portion.

19. The support plate system of claim 18, wherein the body defines a support plate plane extending radially through the centerline axis and perpendicular to the first and second sides, the at least one protruding portion being symmetric about the support plate plane.

* * * * *